(12) United States Patent
Ai

(10) Patent No.: US 10,907,675 B2
(45) Date of Patent: Feb. 2, 2021

(54) FASTENER FOR PLATE-LIKE ELEMENTS AND RELATED PLATE-LIKE ELEMENT ARRANGEMENTS

(71) Applicant: CommScope Technologies LLC, Hickory, NC (US)

(72) Inventor: Bin Ai, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/527,262

(22) Filed: Jul. 31, 2019

(65) Prior Publication Data

US 2020/0049186 A1 Feb. 13, 2020

(30) Foreign Application Priority Data

Aug. 10, 2018 (CN) .......................... 2018 1 0905254

(51) Int. Cl.
 *F16B 21/08* (2006.01)
(52) U.S. Cl.
 CPC ................................. *F16B 21/086* (2013.01)
(58) Field of Classification Search
 CPC .................................................... F16B 21/086
 See application file for complete search history.

(56) References Cited

U.S. PATENT DOCUMENTS

| | | | | |
|---|---|---|---|---|
| 5,011,354 A * | 4/1991 | Brownlee | ............... | F16B 15/00 411/439 |
| 9,562,549 B2 * | 2/2017 | McClure | ................. | B64C 1/066 |
| 9,982,694 B2 * | 5/2018 | Scroggie | ............... | F16B 21/086 |
| 10,641,308 B2 * | 5/2020 | Sugimoto | ............. | F16B 21/065 |
| 2004/0049895 A1 * | 3/2004 | Draggoo | ............... | B60R 21/215 24/297 |
| 2008/0219758 A1 * | 9/2008 | Jatzke | ..................... | F16B 21/18 403/282 |
| 2012/0291240 A1 * | 11/2012 | Suzuki | ................ | B60R 13/0206 24/633 |
| 2013/0136559 A1 * | 5/2013 | Hauser | .................... | F16B 5/065 411/45 |
| 2014/0050548 A1 * | 2/2014 | Loewe | .................. | F16B 5/0607 411/48 |
| 2016/0169259 A1 * | 6/2016 | Burleson | ............... | F16B 5/0642 411/510 |
| 2016/0333917 A1 * | 11/2016 | Aikawa | ................... | F16K 27/00 |

(Continued)

*Primary Examiner* — Jason W San
(74) *Attorney, Agent, or Firm* — Myers Bigel, P.A.

(57) ABSTRACT

A fastener for connecting two layers of stacked plate-like elements includes first through fifth sections. The first section is configured to abut against an outer side of the first plate-like element. The second section has a height corresponding to a thickness of the first plate-like element and is receivable in a through hole of the first plate-like element. The third section is configured to pass through the through hole of the first plate-like element in a first orientation, and a first side of the third section is configured to abut against an inner side of the first plate-like element in a second orientation, and a second side of the third section is configured to abut against an inner side of the second plate-like element. The fourth section is configured to pass through the through hole of the first plate-like element in the first orientation, and the fourth section is receivable in a through hole of the second plate-like element. The fifth section is configured to hold the second plate-like element.

20 Claims, 3 Drawing Sheets

(56) References Cited

U.S. PATENT DOCUMENTS

| | | | |
|---|---|---|---|
| 2016/0348708 A1* | 12/2016 | Lo | F16B 21/086 |
| 2017/0184142 A1* | 6/2017 | Pulsipher | F16B 5/0692 |
| 2019/0032696 A1* | 1/2019 | Sbongk | F16B 21/086 |
| 2020/0049186 A1* | 2/2020 | Ai | F16B 5/10 |
| 2020/0158155 A1* | 5/2020 | Weissenfeld | F16B 21/086 |
| 2020/0217345 A1* | 7/2020 | Liebelt | F16B 21/075 |

* cited by examiner

FASTENER FOR PLATE-LIKE ELEMENTS AND RELATED PLATE-LIKE ELEMENT ARRANGEMENTS

CROSS-REFERENCE TO RELATED APPLICATION

The present application claims priority under 35 U.S.C. § 119 to Chinese Patent Application No. 201810905254.6 (Serial No. 2018081001118480), filed Aug. 10, 2018, the entire content of which is incorporated herein by reference.

FIELD OF THE INVENTION

The present invention relates to a fastener for plate-like elements and to plate-like element arrangements that include such fasteners.

BACKGROUND

It is known in practice to use bolts to connect two layers of stacked plate-like elements, in which many pairs of aligned through holes are provided. During assembly, the bolts are first inserted through all of the through holes of the first plate-like element, and then a spacing sleeve is respectively sleeved on each of the bolts. Next, the second plate-like element is aligned with the corresponding bolts by its respective through holes, and the second plate-like element is lowered, so that the respective bolts pass through the through holes of the second plate-like element, until the second plate-like element is supported on the spacing sleeves. Finally, nuts are tightened on the respective bolts to a predetermined fastening degree. Each bolt, spacing sleeve and nut forms a bolt set.

In such a plate-like element arrangement, there may be many pairs of aligned through holes, and a corresponding number of bolt sets. For example it is possible to have as many as 30 or more bolt sets. If any one of the bolt sets is omitted, or if any one of the bolt sets is incomplete, for example installation of one spacing sleeve is omitted, cumbersome rework is often required. Installation of these bolt sets is also time-consuming and costly. In addition, there are a large number of parts, as each bolt set includes at least three parts.

SUMMARY

Pursuant to embodiments of the present invention, a fastener for connecting two layers of stacked plate-like elements is provided which comprises first through fifth sections that are arranged in sequence along a longitudinal direction, where the first section is configured to abut against an outer side of the first plate-like element by its first side facing towards a first plate-like element; the second section is receivable in a through hole of the first plate-like element; the third section is configured so that it may pass through the through hole of the first plate-like element in a first orientation of the fastener relative to the first plate-like element, and is further configured to abut against an inner side of the first plate-like element by its first side facing towards the first plate-like element in a second orientation of the fastener relative to the first plate-like element, and the third section is further configured to abut against an inner side of the second plate-like element by its second side facing towards the second plate-like element; the fourth section is configured to pass through the through hole of the first plate-like element in the first orientation, and the fourth section is receivable in a through hole of the second plate-like element; and the fifth section extends through the second plate-like element.

The third section may act as a spacer between the two layers of plate-like elements. Since the third section is an integral part of the fastener, there is no need to worry about the problems caused by the omission of the spacing sleeve as in the prior art. In addition, the installation of the fastener is simpler than the bolt sets of the prior art. Here, it is only necessary to rotate the fastener by a predetermined amount in a circumferential direction. The omission of installing a single fastener does not have to result in cumbersome rework, but instead can simply be remedied by installing the omitted fastener.

The fifth section extends through the through hole in the second plate-like element. In some embodiments of the present invention, the fourth section has a height corresponding to a thickness of the second plate-like element, and the fifth section is configured so that it can pass through the through hole of the first plate-like element and through the through hole of the second plate-like element in the first orientation, and is configured so that it may abut against the outer side of the second plate-like element in the second orientation. The fifth section may be used to fasten the second plate-like element in place. The fastening of the second plate-like element can be achieved in a particularly simple manner using such a fifth section.

In other embodiments, the fifth section may include an external thread on which a nut can be screwed for fastening the second plate-like element in place. In still other embodiments, the fifth section may have a perforation (e.g., a hole) into which a pin can be inserted, for fastening the second plate-like element in place.

In some embodiments, the fastener may further comprise a resilient claw that projects from the fifth section, where the resilient claw is clampable into a recess of the second plate-like element in the second orientation, for fixing the fastener in a circumferential direction. The inclusion of such a resilient claw or other locking mechanism may allow the assembler to clearly perceive the end position during installation of the fastener, and the fastener can be reliably held at the end position by the locking mechanism.

In addition, it is also easy to detach the fastener. In particular, the resilient claw may be disengaged from the snap-fit recess, for example disengaged by means of a tool. Then, the fastener is turned back to the first orientation relative to the plate-like element, and the fastener may then be readily pulled out of the through holes of the two layers of plate-like elements.

In some embodiments, the fastener may be integrally formed of plastic, for example formed by injection molding, thereby achieving a particularly inexpensive fastener.

In some embodiments, the first section may be provided with a strip-like operation handle (or other structure or feature that allows an installer to easily rotate the fastener) on its second side facing away from the first plate-like element. By operating the handle, the assembler may easily install the fastener.

In some embodiments, the first section may be cylindrical, and may have a diameter greater than a minimum size of the through hole of the first plate-like element; the second section may be cylindrical, and may have a diameter equal to or smaller than a minimum size of the through hole of the first plate-like element; and the third section and the fourth section may be columnar in shape having a non-circular cross section.

It will be appreciated, however, that one or more of the first through fourth sections may have other shapes in other embodiments. For example, the first section may comprise a plurality of segments, rods or other discrete elements that are spaced apart from each other in a circumferential direction and that extend in a radial direction. The second section may have a non-circular cross section. The third section may also comprise a plurality of segments, rods or other discrete elements that are spaced apart from each other in a circumferential direction and that extend in a radial direction. In a longitudinal direction, the third section may also be constituted in such a way that the middle thereof is indented with respect to the first side and second sides thereof, so as to reduce the total amount of material required to fabricate the fastener.

Pursuant to further embodiments of the present invention, a plate-like element arrangement is provided that comprises two or more layers of stacked plate-like elements, in which pairs of aligned through holes are provided, where the plate-like element arrangement further comprises a plurality of fasteners according to embodiments of the present invention, each of which is mounted in one of pairs of through holes.

In some embodiments of the present invention, each plate-like element may have more than 10 through holes, or more than 20 through holes, or even more than 30 through holes.

In some embodiments, the fasteners may have a uniform shape and size.

In some embodiments, the first plate-like element and the fastener may have matching indicia for determining the first orientation of the fastener relative to the first and second plate-like elements.

Pursuant to still further embodiments of the present invention, a fastener for extending through a first through hole in a first plate-like element and a second through hole in a second plate like element to hold the first and second plate-like elements together in a stacked and spaced apart arrangement is provided, where the fastener is rotatable between a first orientation and a second orientation relative to the first plate-like element. This fastener comprises a first section that is configured to abut against an outer side of a first plate-like element when the fastener extends through the first and second through holes, a third section that is configured to pass through the first through hole when the fastener is in the first orientation and is configured to abut against an inner side of the first plate-like element and against an inner side of the second plate-like element when the fastener is in the second orientation, and a fifth section that is configured to pass through the first through hole when the fastener is in the first orientation, the fifth section comprising a locking member that extends through and beyond the second through hole when the fastener extends through both the first and second through holes.

In some embodiments, the fastener further comprises a second section that is between the first section and the third section, the second section configured to be within the first through hole when the fastener is fully inserted through the first and second through holes.

In some embodiments, the fastener further comprises a fourth section that is between the third section and the fifth section, the fourth section configured to be within the second through hole when the fastener is fully inserted through the first and second through holes.

In some embodiments, the fifth section comprises at least one locking element that is configured to pass through the first and second through holes when the fastener is in the first orientation and is configured to abut against an outer side of the second plate-like element when the fastener is in the second orientation.

In some embodiments, the fastener further comprises a sixth section that includes at least one cantilevered resilient claw.

In some embodiments, the fastener is a monolithic plastic fastener.

DETAILED DESCRIPTION

Figure 1:
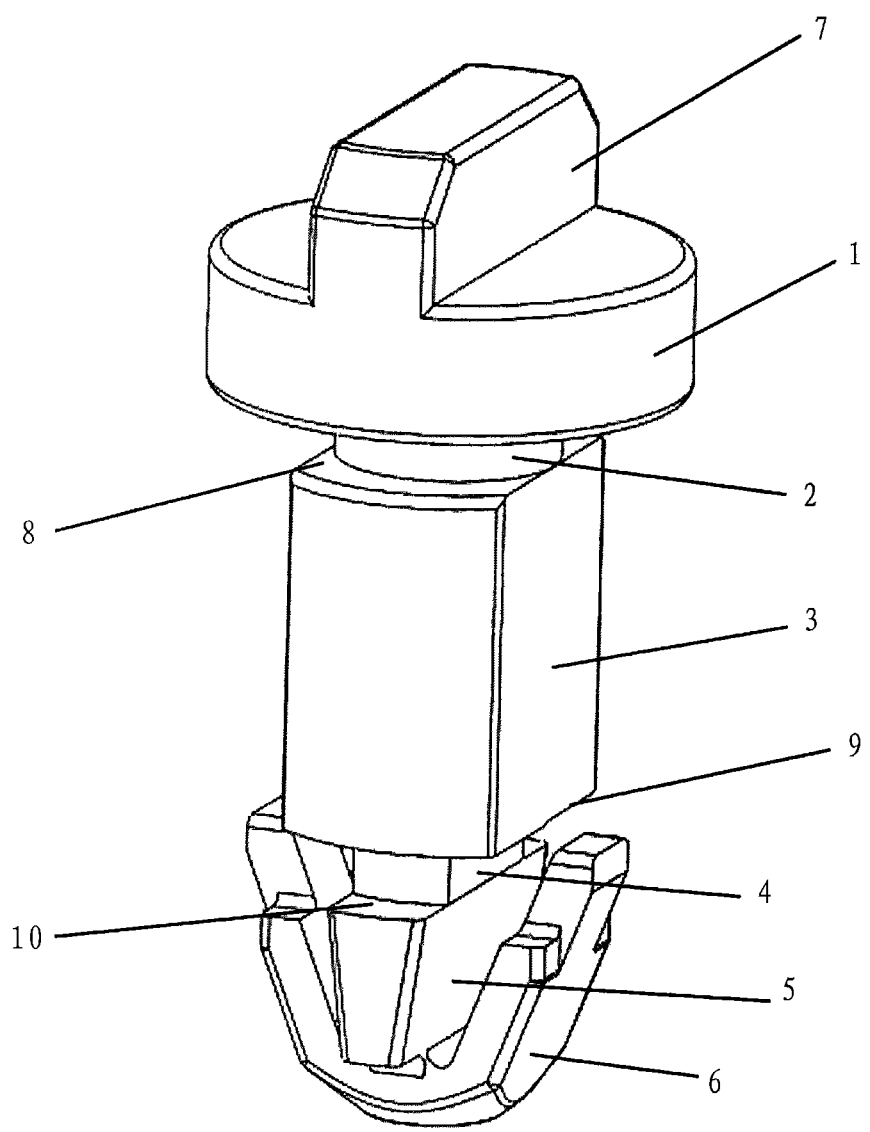
FIG. 1 is a schematic perspective view of a fastener for plate-like elements in accordance with embodiments of the present invention.
Figure 2:
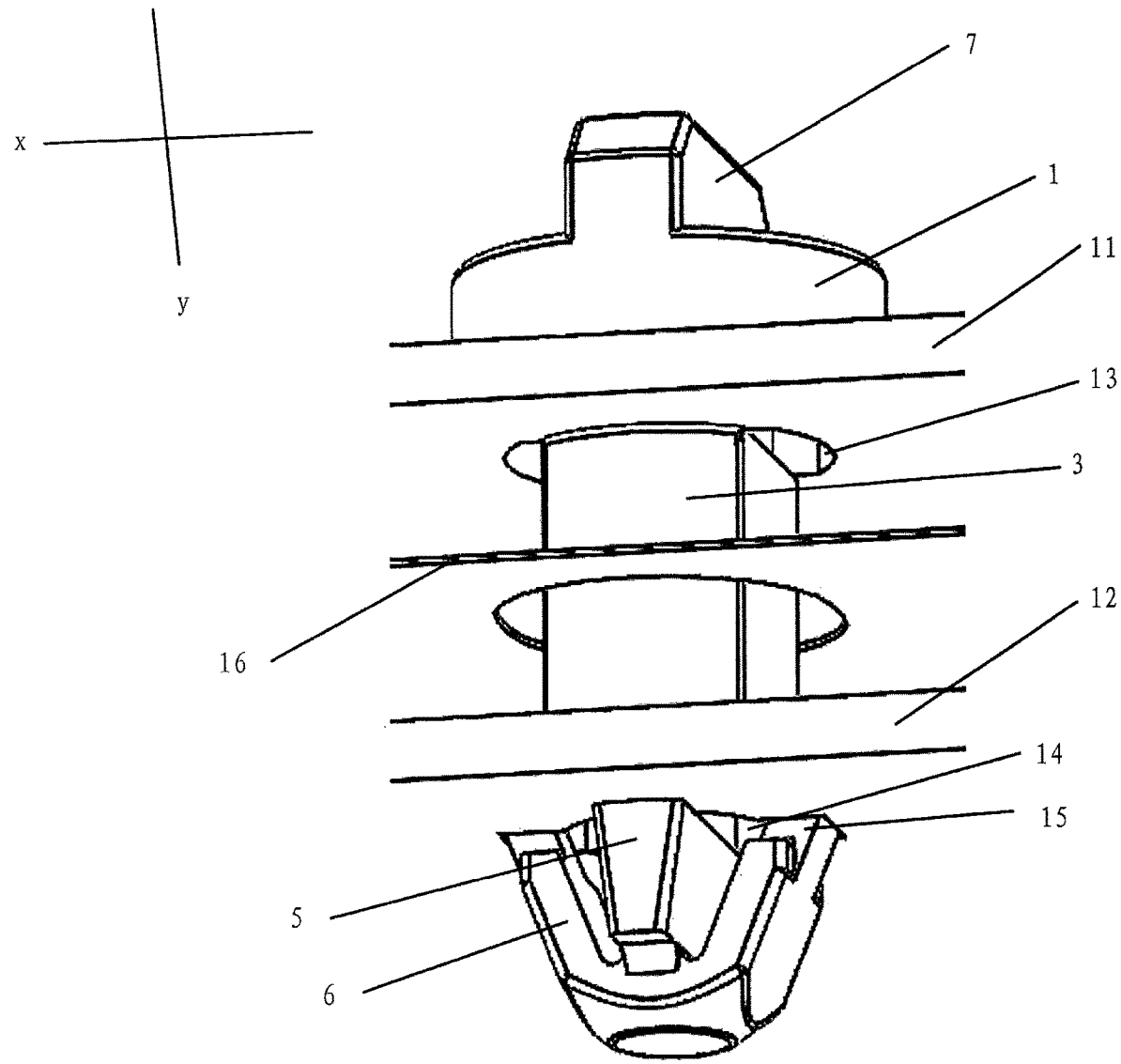
FIG. 2 is a schematic partial view of a plate-like element arrangement in accordance with embodiments of the present invention.
Figure 3:
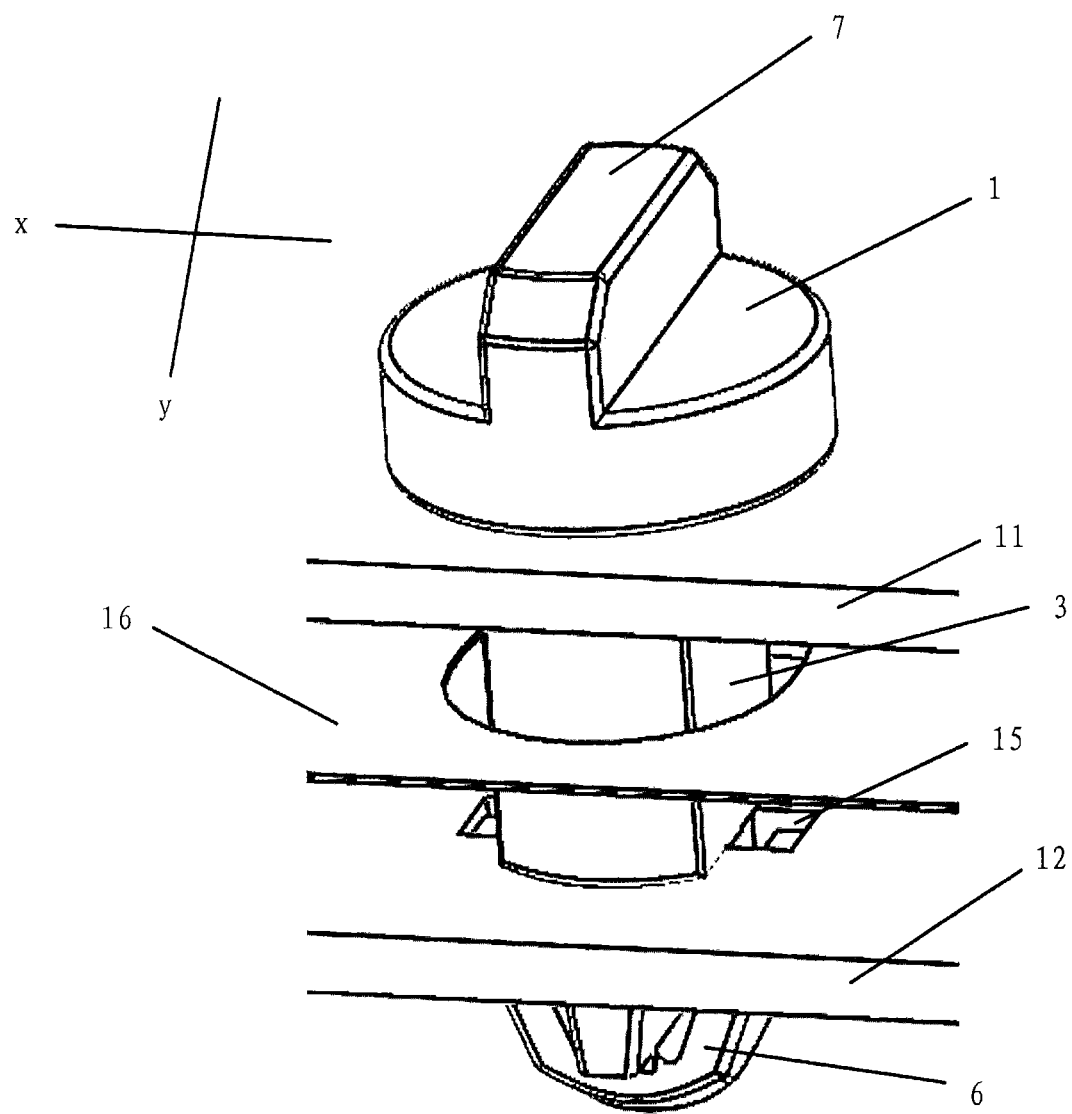
FIG. 3 is a schematic partial view of the plate-like element arrangement of FIG. 2 observed from another perspective.

FIG. 1 is a schematic perspective view of a fastener for plate-like elements in accordance with embodiments of the present invention, and FIGS. 2 and 3 show a schematic partial view of a plate-like element arrangement in accordance with embodiments of the present invention that includes the fastener of FIG. 1.

In the plate-like element arrangement shown in FIGS. 2 and 3, the upper first plate-like element 11 and the lower second plate-like element 12 are arranged to overlap each other while being spaced apart from each other. Each through hole 13 in the first plate-like element 11 may be aligned with a corresponding one of the through holes 14 in the second plate-like element 12. Many pairs of through holes 13, 14 are provided in the two layers of plate-like elements. For example, the number of pairs of through holes may be as many as 30 pairs or more, for example 40 pairs or more. A fastener such as shown in FIG. 1 may be mounted through each pair of through holes. As shown in FIGS. 2 and 3, in an intermediate space between the two layers of plate-like elements, an additional member 16 may also be provided as needed. If the member 16 is required to be passed through by the fastener, the member 16 needs to be provided with a corresponding through hole.

In the embodiment shown in FIG. 1, the fastener comprises a first section 1, a second section 2, a third section 3, a fourth section 4, and a fifth section 5 in sequence in a longitudinal direction. A strip-like operation handle 7 is provided on the upper side of the first section 1. As an alternative or a supplement, an operating recess or an operating projection may also be provided on a circumferential surface of the first section 1. A pair of resilient claws 6 projecting upward may be provided on the lower side of the fifth section 5.

During installation, the fastener is inserted into the through hole 13 of the first plate-like element 11 in its first orientation x with respect to the first and second plate-like elements 11, 12, until a lower portion of the first section 1 abuts against the outer side of the first plate-like element 11 by its lower side facing towards the first plate-like element 11. At this time, the second section 2 is received in the through hole 13, and the third section 3 has not yet abutted against the inner side of the first plate-like element 11 by its upper first side 8 facing towards the first plate-like element, while the third section abuts against the inner side of the second plate-like element 12 by its second lower side 9 facing towards the second plate-like element. The fourth section 4 is received through the through hole 14, and the fifth section 5 or the first side 10 of the fifth section facing towards the second plate-like element 12 has not yet abutted against the outer side of the second plate-like element 12.

Next, when the fastener is rotated by a predetermined angle and thereby reaches the second orientation y of the fastener relative to the plate-like elements 11, 12, the third section 3 abuts against the inner side of the first plate-like element 11 by its first side 8 facing upward towards the first plate-like element 11, the third section 3 is held to abut against the inner side of the second plate-like element 12 by its second side 9 facing downward towards the second plate-like element 12, the fifth section or its first side 10 abuts against the outer side of the second plate-like element 12, and the resilient claws 6 are clamped into mated recesses 15 of the second plate-like element 12. It may be particularly advantageous to provide a pair of resilient claws 6 opposed to each other and a pair of mated recesses 15, although one or more than two resilient claws 6 are also possible. The height dimension of the second section 2 may correspond to the thickness of the first plate-like element 11. It may be particularly advantageous to clamp the first plate-like element 11 between the first section 1 and the third section 3 in a manner of an interference fit. The height dimension of the fourth section 4 may correspond to the thickness of the second plate-like element 12. It also may be advantageous to clamp the second plate-like element 12 between the third section 3 and the fifth section 5 in a manner of an interference fit. The height dimension of the third section may determine the spacing between the two layers of plate-like elements 11, 12.

In order to facilitate the installation of the fastener by an assembler, matching indicia may be provided on the outer side of the first plate-like element 11 and on the fastener. When the indicia are aligned with each other, the fastener is in the first orientation x with respect to the plate-like elements 11, 12. In the case where the fastener has the strip-like operation handle 7 as shown in FIGS. 2 and 3, the operation handle 7 itself may be used as such an indicium.

The plate-like elements 11, 12 may be, for example, a circuit board or other self-supporting or non-soft sheet-like element, such as a thin metal sheet, an engineering plastic sheet or the like.

Finally, it is to be noted that, the above-described embodiments are merely for understanding the present invention but do not constitute a limit on the protection scope of the present invention. For those skilled in the art, changes may be made on the basis of the above-described embodiments, and these changes do not depart from the protection scope of the present invention. The technical features recited in the present application can be arbitrarily combined as long as such combinations are not contradictory to each other, and all of these combinations are the technical contents recited in the present application.

That which is claimed is:

1. A fastener comprising:
   a first section, a second section, a third section, a fourth section and a fifth section in sequence in a longitudinal direction, wherein
   a first side of the first section is configured to abut against an outer side of a first element;
   the second section is receivable in a through hole of the first element;
   the third section is configured to pass through the through hole of the first element in a first orientation of the fastener relative to the first element and, in a second orientation of the fastener relative to the first element, a first side of the third section is configured to abut against an inner side of the first element and a second side of the third section is configured to abut against an inner side of a second element;
   the fourth section is receivable in a through hole of the second element; and
   the fifth section has a locking segment with an outer perimeter having a pair of spaced apart long sides and a pair of opposing short sides and is configured to pass through the through hole of each of the first and second elements when the fastener is in the first orientation, wherein, with the fastener in the second orientation, an upper surface of the locking segment that is adjacent each of the short sides abuts an outer side of the second element, and wherein the upper surface adjacent each of the short sides extends laterally outward further than the fourth section.

2. The fastener according to claim 1, wherein the third section has a greater height than the second, fourth and fifth sections, wherein the third section has a greater lateral extent than the second and fourth sections, wherein the third section has a non-circular cross-section, and wherein the fourth section has a height corresponding to a thickness of the second element.

3. The fastener according to claim 2, wherein the fastener further comprises a resilient claw projecting from the fifth section to extend laterally outward adjacent the locking segment, wherein the resilient claw is configured to laterally translate between a first position and a second laterally inwardly compressed position, and wherein the resilient claw is configured to clamp into a recess of the second element in the second orientation for holding the fastener in a fixed orientation.

4. The fastener according to claim 3, wherein the fastener is a monolithic plastic fastener.

5. The fastener according to claim 1, wherein the first section is provided with an operation handle having a radially extending projection strip across a medial portion thereof on its second side facing away from the second section.

6. The fastener according to claim 1, wherein the first section is cylindrical and has a diameter greater than a minimum size of the through hole of the first element, the second section is cylindrical, and has a diameter equal to or smaller than the minimum size of the through hole of the first element and smaller than the diameter of the first section, and wherein the third section and the fourth section each have a non-circular cross section.

7. The fastener according to claim 3, wherein the second section has a height corresponding to a thickness of the first element, wherein, in the second position, the resilient claw extends out laterally further than the third and fourth sections, and wherein the resilient claw has an upwardly extending free end portion that is adjacent the fourth section and resides above the upper surface of the locking segment.

8. A stacked element arrangement, comprising first and second layers of stacked circuit boards as the elements, in which through holes stacked in pairs are provided, wherein, the element arrangement further comprises a plurality of fasteners according to claim 1, each of which is mounted in one of the pairs of through holes.

9. An arrangement, comprising:
   a first planar substrate comprising at least 10 through holes;
   a second planar substrate in a stacked and spaced apart relationship with the first planar substrate, the second planar substrate comprising at least 10 through holes aligned with the at least 10 through holes of the first planar substrate to define 10 pairs of through holes; and at least 10 fasteners, one extending through each of the 10 pairs of through holes, wherein each fastener of the at least 10 fasteners comprise:

a first section, a second section, a third section, a fourth section and a fifth section in sequence in a longitudinal direction, wherein a first side of the first section is configured to abut against an outer side of the first planar substrate;

the second section is receivable in a respective one of the through holes of the first planar substrate;

the third section is configured to pass through the respective one of the through holes of the first planar substrate in a first orientation of the fastener relative to the first planar substrate and, in a second orientation of the fastener relative to the first planar substrate, a first side of the third section is configured to abut against an inner side of the first planar substrate and a second side of the third section is configured to abut against an inner side of the second planar substrate;

the fourth section is receivable in a respective one of the through holes of the second planar substrate; and the fifth section has a locking segment with an outer perimeter having a pair of spaced apart long sides and a pair of opposing short sides and is configured to pass through the respective ones of the through holes of the first and second planar substrates when the fastener is in the first orientation, wherein, with the fastener in the second orientation, an upper surface of the locking segment that is adjacent each of the short sides abuts an outer side of the second planar substrate, and wherein the upper surface adjacent each of the short sides extends laterally outward further than the fourth section.

10. The element arrangement according to claim 8, wherein the fasteners have a uniform shape and size.

11. The element arrangement according to claim 8, wherein the first element and the fastener have matching indicia, for determining the first orientation of the fastener relative to the first and second elements.

12. A fastener assembly, comprising:

a first element comprising a first through hole, the first through hole having a circular shape;

a second element comprising a second through hole, wherein the second through hole has a perimeter shape with first and second opposing long sides that are curvilinear and spaced apart a maximal distance at a medial portion thereof, wherein the first and second long sides merge into opposed short sides defining end portions of the second through hole, and wherein the short sides extend a distance that is less than the maximal distance;

a fastener extending through the first through hole, and the second through hole to hold the first and second elements together in a stacked and spaced apart arrangement, wherein the fastener is rotatable between a first orientation and a second orientation relative to the first element and the second element, the fastener comprising:

a first section that is configured to abut against an outer side of the first element when the fastener extends through the first and second through holes;

a third section that is configured to pass through the first through hole when the fastener is in the first orientation and is configured to abut against an inner side of the first element and against an inner side of the second element when the fastener is in the second orientation; and a fifth section that is configured to pass through the first through hole when the fastener is in the first orientation, the fifth section comprising a locking member that extends through and beyond the second through hole when the fastener extends through both the first and second through holes, wherein the locking member has a body having a laterally elongate shape with short sides and long sides and first and second exposed upper surface segments that are adjacent the short sides of the body, wherein the body of the locking member is configured to pass through the first and second through holes when the fastener is in the first orientation, and wherein, with the fastener in the second orientation, the first and second upper surface segments abut an outer side of the second element.

13. The fastener assembly of claim 12, further comprising a second section that is between the first section and the third section, the second section configured to be within the first through hole when the fastener is fully inserted through the first and second through holes.

14. The fastener assembly of claim 13, further comprising a fourth section that is between the third section and the fifth section, the fourth section configured to be within the second through hole when the fastener is fully inserted through the first and second through holes, wherein the third section has a greater height than the second, fourth and fifth sections, wherein the third section has a greater lateral extent than the second and fourth sections, and wherein the third section has a non-circular cross-section.

15. The fastener assembly of claim 14, wherein the body of the locking segment tapers in least one dimension to narrow at a bottom thereof.

16. The fastener assembly of claim 12, further comprising a sixth section that includes a cantilevered resilient claw, wherein the cantilevered resilient claw projects outward adjacent the locking segment, and wherein the cantilevered resilient claw has an upwardly extending free end portion.

17. The fastener assembly of claim 12, wherein the fastener is a monolithic plastic fastener.

18. The fastener assembly of claim 12, wherein the fastener further comprises at least one resilient claw that extends laterally outward adjacent only one of the long sides or adjacent both of the long sides of the locking segment, wherein the at least one resilient claw is configured to laterally translate between a first position and a second position, and wherein, in the second position, the at least one resilient claim is laterally inwardly compressed relative to the first position.

19. The fastener assembly of claim 18, wherein the at least one resilient claw has a free end portion that faces the first section and that resides above the exposed upper surface segments, and wherein the at least one resilient claw is configured to clamp into a recess of the second element in the second orientation for holding the fastener against the second element in the second orientation.

20. The fastener assembly of claim 12, wherein the first and the second elements are each circuit boards.

* * * * *

UNITED STATES PATENT AND TRADEMARK OFFICE
CERTIFICATE OF CORRECTION

| | | |
|---|---|---|
| PATENT NO. | : 10,907,675 B2 | Page 1 of 1 |
| APPLICATION NO. | : 16/527262 | |
| DATED | : February 2, 2021 | |
| INVENTOR(S) | : Bin Ai | |

It is certified that error appears in the above-identified patent and that said Letters Patent is hereby corrected as shown below:

On the Title Page

(30) Foreign Application Priority Data:
Please correct "2018 1 0905254" to read -- 2018 1 0905254.6 --

In the Claims

Column 8, Line 53, Claim 18:
Please correct "resilient claim" to read -- resilient claw --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*